Aug. 20, 1940.   B. R. BENJAMIN   2,211,877
CULTIVATOR DEMONSTRATOR
Filed Aug. 30, 1939   3 Sheets-Sheet 1
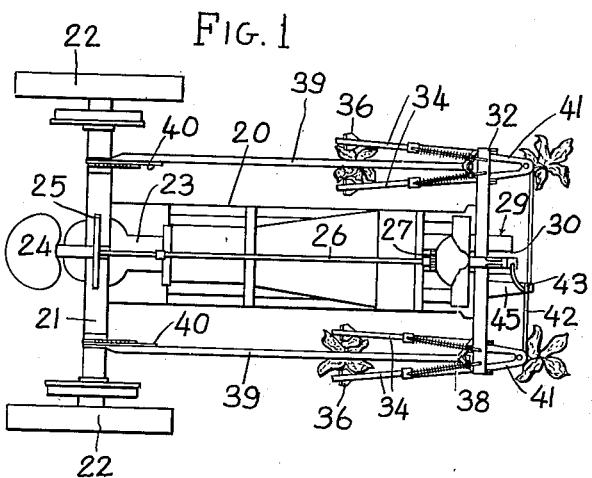
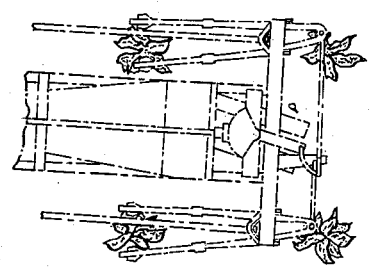
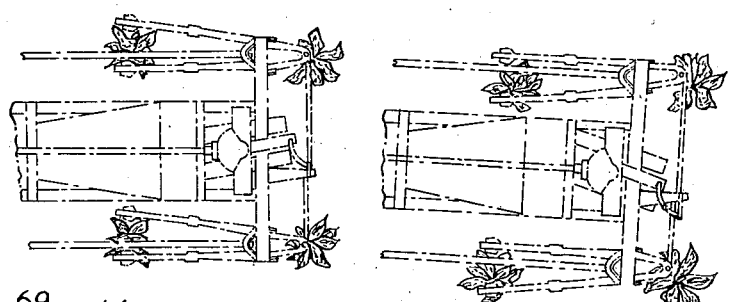
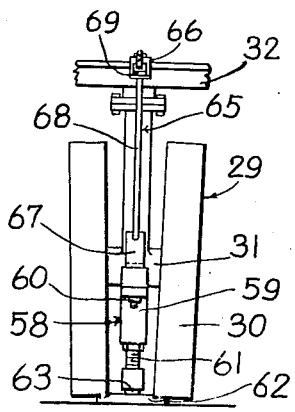
INVENTOR
B. R. BENJAMIN

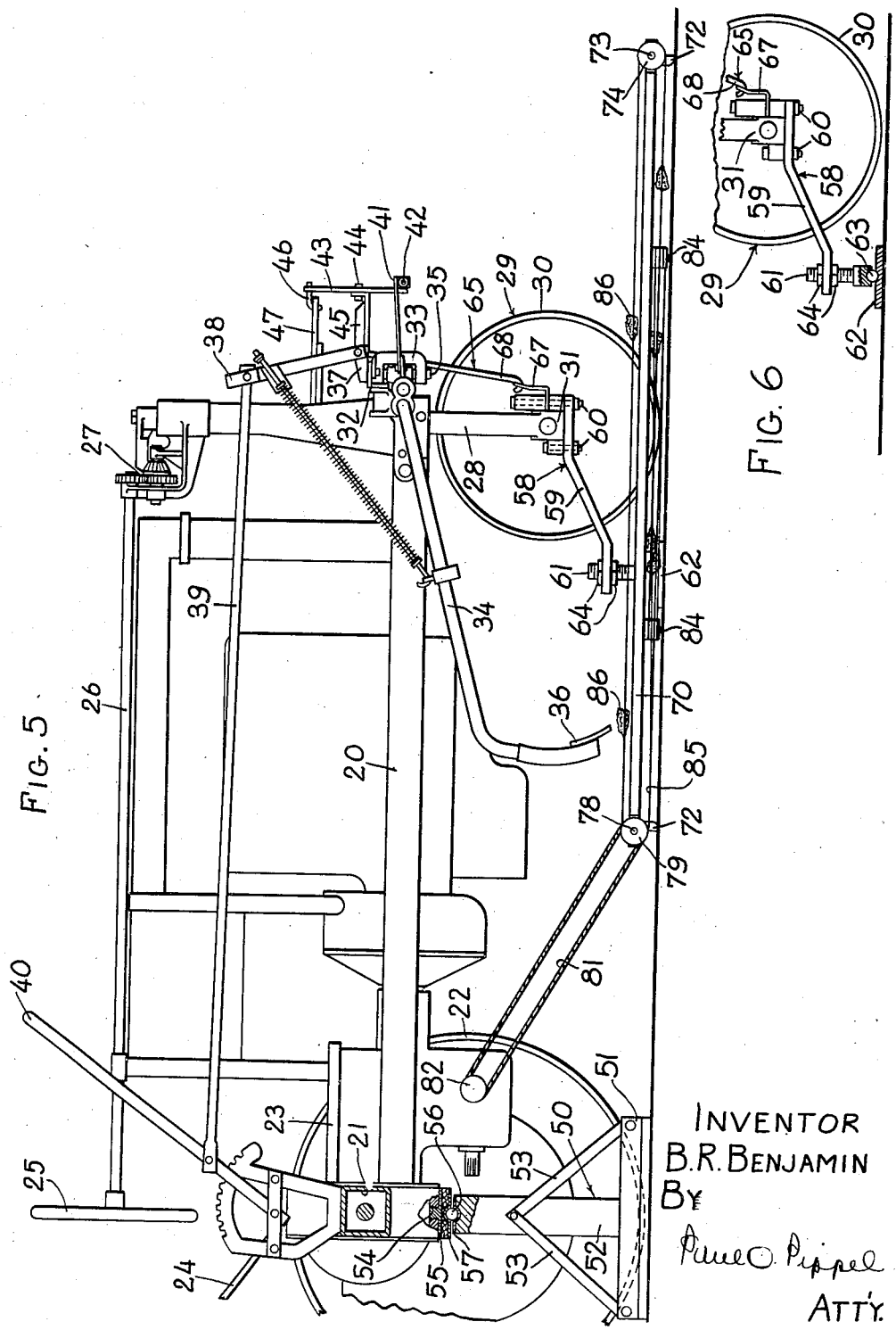

Aug. 20, 1940.                B. R. BENJAMIN                2,211,877
                            CULTIVATOR DEMONSTRATOR
                           Filed Aug. 30, 1939          3 Sheets-Sheet 3
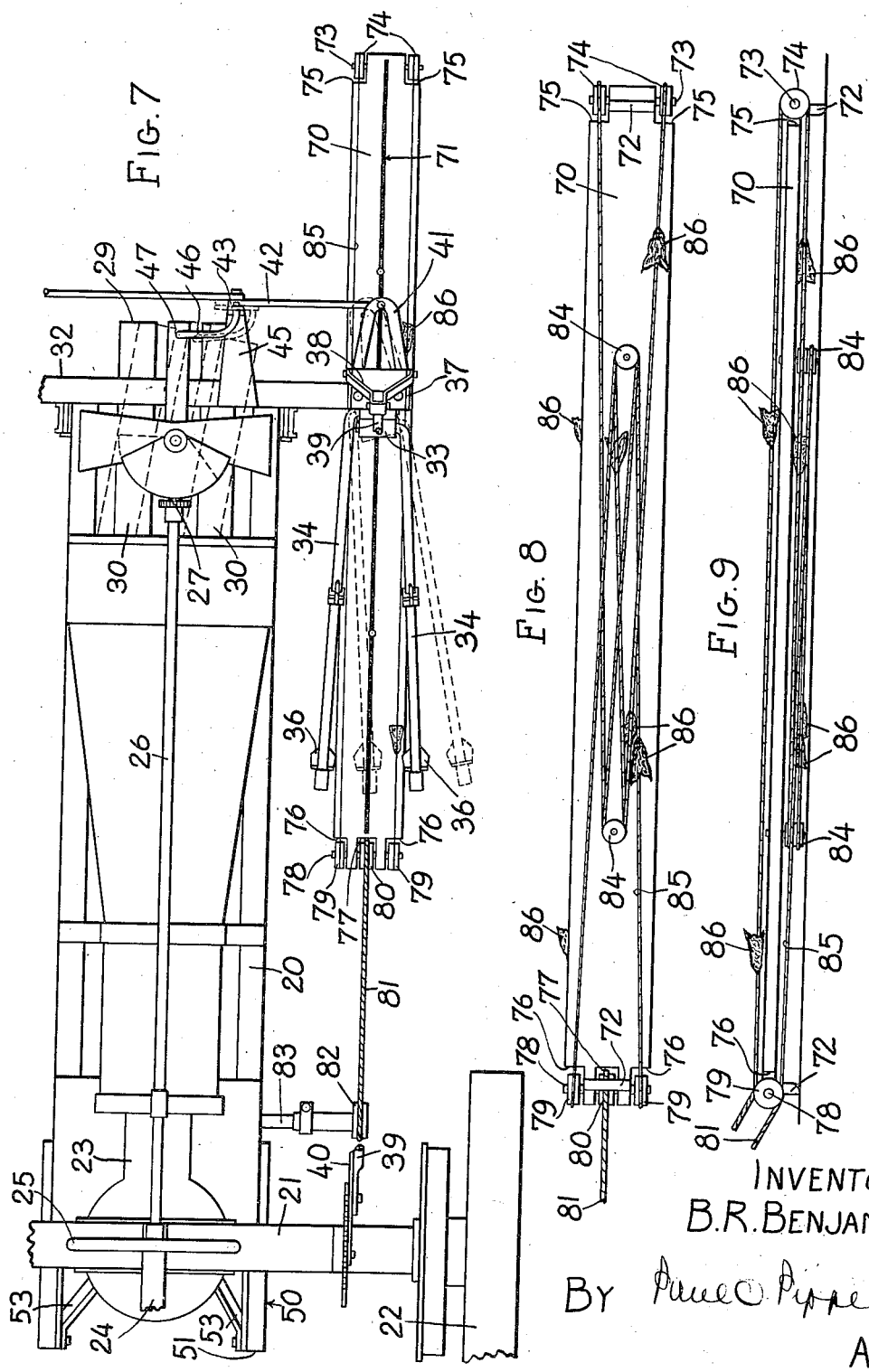
INVENTOR
B. R. BENJAMIN
BY Paul O. Pippel
ATTY.

Patented Aug. 20, 1940

2,211,877

UNITED STATES PATENT OFFICE 2,211,877

CULTIVATOR DEMONSTRATOR

Bert R. Benjamin, Oak Park, Ill., assignor to International Harvester Company, a corporation of New Jersey Application August 30, 1939, Serial No. 292,655

10 Claims. (Cl. 35—13)

This invention relates to means for demonstrating the operation of an agricultural machine. More particularly it relates to such means for a machine of the type commonly known as a tractor-mounted cultivator.

The invention contemplates the provision of means for demonstrating the steerability of a tractor and the shiftability of a cultivator attachment carried thereon, and is particularly adapted for use in connection with a tractor of the tricycle type, in which the tractor comprises a generally narrow, longitudinal main frame supported at its rear on a pair of laterally spaced ground wheels and at its front on a steerable wheeled-truck including a vertical standard turnable about a turning axis and connected to steering apparatus which includes a steering wheel operable from the operator's station. The cultivator is of the type including laterally shiftable or swingable shovels mounted respectively at opposite sides of the tractor body and interconnected with the steering apparatus, so that the shovels may be guided by the operator in cultivating misalined row-crop plants. A preferred type of tractor-mounted cultivator is disclosed in assignee's Patent No. 1,899,932 dated March 7, 1933.

The invention contemplates the provision of means for demonstrating the desirable features and advantages of a tractor-mounted cultivator of the type referred to above. The means is particularly adaptable to a sales program embodying the comparison between a tractor-mounted cultivator of the shiftable type and a tractor-mounted cultivator of the rigid type.

Since cultivating row-crop plants becomes quite difficult when certain plants are misalined, it is desirable to illustrate to prospective purchasers the ease with which a shiftable type cultivator can handle the cultivation problem. Numerous circumstances prevent the operation of a cultivator in actual tests out of doors and it is, therefore, desirable to provide a device or means for demonstrating the function of such machinery either as part of a permanent display or of a portable display which may be moved from place to place and quickly and conveniently set up wherever required. The fact that the implement and the demonstrating means can be utilized without operating the implement over a field presents an important feature in that a demonstration and display may be made in small areas otherwise unsuited for demonstration purposes.

The principal object of the present invention then is to provide a demonstrating means for demonstrating the operation and function of an agricultural implement.

An important object is to provide means for pivotally supporting the rear end of a tractor with its wheels clear of the ground and for supporting the front end of the tractor in a similar manner but for lateral swinging movement generally about a pivot provided by the rear supporting means.

Another important object is to interconnect the tractor steering apparatus and the front supporting means so that the tractor may be swung laterally by operation of the steering apparatus.

Another important object is to provide means arrangeable at one side of the tractor generally in alinement with the shovels of the cultivator, such means being longitudinally movable with respect to the tractor and shovels and representing or simulating row-crop plants.

Another object is to provide means for driving the movable representing or indicating means from a power shaft of the tractor.

And, another object is to provide means for accommodating additional strains placed on the tractor by the supporting means.

Briefly, these and other desirable objects and important features of the invention are achieved in one preferred form of the invention, in conjunction with a tractor-mounted cultivator of the type above referred to, by the provision of a support at the rear end of the tractor for supporting the tractor thereat on a point substantially midway between the rear ground wheels. The front end of the tractor is supported on a support which includes a rearwardly extending member rigidly secured at its front end to the vertical standard of the steerable truck and pivotally associated with the ground at its rear for movement about a vertical axis at a point rearwardly spaced from the vertical axis of the truck standard. The front support is thus associated, through the medium of the standard, with the tractor steering apparatus, and the steering of the tractor swings the tractor laterally generally about the rear support as a pivot. Both supporting means support the tractor with the tractor wheels slightly clear of the ground. A longitudinally extending member, appropriately provided with an endless belt, is arranged at one side of the tractor generally in alinement with a cultivator shovel which is raised and disposed in spaced relation about the member. The endless belt carries indicia representing or simulating the location of row-crop plants. The endless belt is preferably driven by a power shaft carried ried by the tractor. The indicia is thus movable longitudinally with respect to the cultivator shovel, and the shovel may be shifted by the steering apparatus in a manner similar to the manner in which it would be shifted were the implement engaged in actual cultivation. Since the tractor is supported for lateral swinging movement generally about the pivot provided by the rear support, the actions of the tractor in the field are thus simulated and an operator can readily appreciate the effort required to steer the tractor in order to guide the cultivator shovel in proper location with respect to either alined or misalined plants.

A further and more complete understanding of the objects and desirable features of the invention may be had from the accompanying sheets of drawings, in which:

Figure 1 is a general plan view of a tractor-mounted cultivator of the type referred to, showing the relation between the cultivator shovels of a two-row cultivator and properly alined row-crop plants;

Figures 2, 3 and 4 are diagrammatic views showing the positions taken by the front end of the tractor as it is steered and the cultivator shifted to accommodate misalined plants;

Figure 5 is a side view of a tractor showing the supporting means therefor and the means movable with respect to the tractor for representing or simulating the location of row-crop plants;

Figure 6 is a detail view of the front support;

Figure 7 is a partial plan view of the structure shown in Figure 1;

Figure 8 is a bottom view of the device utilized for representing plant locations;

Figure 9 is a side view of the same; and,

Figure 10 is a front view of a tensioning means for relieving extra strains placed on the front end of the tractor by the front supporting means.

The tractor chosen for the purposes of illustration is of the tricycle type comprising a generally narrow, longitudinal main body 20 including a transverse rear axle housing 21 carrying a pair of laterally spaced, rear ground wheels 22. The rear axle housing contains the usual drive gearing associated with the transmission contained in a housing 23 located forwardly of the rear axle housing. The rear axle housing 21 supports centrally thereof an operator's station 24, just forwardly of which is located a steering wheel 25 carried on a longitudinally extending steering shaft 26 connected through suitable gearing 27 to a vertically mounted standard 28 turnable about a vertical axis and forming part of a steerable front truck 29, which in the present instance includes a pair of closely spaced wheels 30 journaled on stub-axles carried in an axle portion 31 of the standard 28.

The particular cultivator chosen for purposes of illustration is of the type disclosed in the patent above referred to and comprises a transverse bar 32 rigidly carried by and across the front end of the tractor body 20. Each opposite end of the bar 32 is provided with a bracket 33 which pivotally carries a pair of rearwardly extending, longitudinal cultivator beams or units 34. The pivotal connection between the beam 34 and the bracket 33 is indicated at 35 in Figure 5 and provides a pivot on a vertical axis. Each beam carries a cultivator shovel 36 of a conventional type. The particular tractor-mounted cultivator illustrated is of the two-row type and includes a pair of beams 34 at each side, as shown in Figures 1 to 4.

The transverse bar 32 further includes at each of its opposite ends a bracket 37, to which is connected for forward and rearward swinging movement about a horizontal axis an upstanding, bifurcated arm 38, in turn connected to a rearwardly extending lifting pipe 39 associated with lifting means in the form of a hand lever 40 pivotally carried on the rear axle housing 21. It will be understood, of course, that a separate lifting means is provided for each cultivator unit and that each lifting means includes connections to the respective unit 34.

The forward end of each cultivating unit rigidly carries a forwardly extending member 41 which is pivotally connected by a transversely extending link member 42 to the lower end of a vertically extending arm 43. The arm 43 is pivoted on a horizontal, longitudinal axis intermediate its ends, as at 44, to a horizontal bracket 45 rigidly carried by the transverse bar 32. The upper end of the arm 43 is connected by a link 46 to a forwardly extending arm 47 connected to the vertical standard 28. This type of construction is well known to those skilled in the art and is not illustrated and described in detail here. It suffices for the purposes of the present invention that operation of the steering wheel 25 rotates the standard 28 about its vertical axis, the action effecting swinging of the arm 43, which, through the medium of the links 42 and the members 41, shifts the cultivating units 34 laterally about the pivot axes 35 of the brackets 33.

The operation of the tractor-mounted cultivator is best illustrated in Figures 1 to 4, wherein it will be seen that the cultivating units are shifted laterally to accommodate misalined plants. The function of such an implement and the problems encountered in cultivating are well understood by those skilled in the art and need not be more fully set out here.

In order that the tractor-mounted cultivator may be demonstrated and displayed to the best advantage, it is desirable that means be provided to illustrate the ease with which it can be operated. For this purpose the present invention contemplates the provision of supporting means for supporting the rear end of the tractor with the ground wheels 22 generally clear of the ground or floor. This supporting means includes a support or jack 50 having a base 51, a vertical standard 52, and reenforcing braces 53. The support is disposed below the tractor and supports the rear end thereof at a point generally midway between the wheels 22 and preferably on a point lying generally in the transverse vertical plane passed through the rear wheel axis. In the present instance means is provided for properly locating and supporting the tractor at its rear end. The rear axle housing 21 is formed at its under side with a threaded lubricant drain opening 54, from which the usual drain plug is removed and into which is threaded a plate member 55. Since the tractor is to remain stationary during the demonstration, it is immaterial that the lubricant is drained from the housing 21. The upper end of the standard 52 of the support 50 includes pivot means in the form of a ball 56 carried between a pair of plates 57 interposed between the plate 55 and the upper end of the standard 52. This means adapts the support 50 to carry the tractor generally in a floating manner.

The front end of the tractor is also supported with the front wheels 30 generally clear of the ground or floor, and, to this end, a support 58 is provided. This support comprises a longitudinally extending member 59 rigidly secured at its forward end by bolts 60 to the axle portion 31 of the truck standard 28. The member 59 extends rearwardly to a point spaced rearwardly from the vertical axis of the truck standard 28 and is supported thereat by a vertical member 61 pivotally carried on a plate or base 62 through the medium of a ball 63. The member 61 is preferably threaded and carries a pair of lock nuts 64 arranged respectively at opposite upper and lower sides of the member 59. These lock nuts provide means for adjusting the height of the member 59. The provision of the ball 53 establishes a vertical pivot axis rearwardly spaced from the turning axis of the truck standard 28, and, since the member 59 is rigidly carried by the standard 28, the front end of the tractor will be swung laterally upon operation of the steering apparatus, generally about the rear pivot point provided by the pivot ball 56 in the rear support 50. The front support is thus associated with the tractor steering apparatus and lateral swinging of the tractor can be controlled by an operator seated at the operator's station 24. At the same time, the cultivating units 34 will be shifted laterally. The lateral swinging of the tractor generally simulates lateral movement of the tractor to either side as the same is steered when the shovels 36 are guided to cultivate misalined plants. The lateral swinging of the front end of the tractor will be best appreciated from an examination of Figures 1 to 4.

It will be noted that the front end of the tractor is supported at a considerable distance rearwardly of the axis of the front wheels 30 and it has been found that certain undesirable strains may be placed upon the bearings of the vertical standard 28. To obviate difficulties resulting from such strains, a means 65 has been provided to draw the lower portion of the standard 28 forwardly with respect to the tractor. This means comprises, as best shown in Figure 10, a bracket 66 rigidly carried by a central portion of the transverse bar 32. The axle portion 31 of the standard 28 (Figure 5) includes an angle bracket 67 rigidly carried by the standard through the medium of one of the bolts 60 which secures the front support 58. A hanger bar 68 is connected between the brackets 66 and 67, the upper end of the bar being threaded and carrying an adjusting nut 69. The nut 69 is tightened just enough to balance the pressure on the bearings of the vertical standard 28.

Another important feature of the present invention is to provide means simulating or representing the locations of row-crop plants, and to this end there is provided a longitudinal member or board 70 arranged at one side of the tractor generally in longitudinal alinement with the cultivator shovels 36. The board is provided with a longitudinally extending line or mark 71 indicating the exact center line of a row of plants. The board is arranged at the side of the tractor with this center line exactly centrally between the points of the shovels 36, with the wheels 30 of the front truck 29 in straight ahead position and with the cultivating units 34 in position for cultivating properly alined rows. The board 70 is supported in spaced relation above the floor on supporting members 72 located respectively at opposite ends thereof. The forward end of the board 70 includes a transverse shaft 73 carrying at its opposite ends respectively two pulleys 74. The board is cut out at this end, as at 75, generally to house the pulleys. The rearward end of the board is cut out at opposite corners, as at 76, and centrally, as at 77, and carries a transverse shaft 78, which in turn rigidly carries three pulleys—two outer pulleys 79, and a drive pulley 80. The drive pulley 80 is driven by a flexible belt 81 trained about a pulley 82 carried on a power shaft 83 extending transversely from a lower portion of the drive housing 23 disposed forwardly of the axle housing 21. In the present instance, the shaft 83 represents the tractor pulley shaft. It will be understood, of course, that the pulley 80 may be driven by any suitable means either connected with or separate from the tractor.

As best shown in Figures 8 and 9, the board 70 carries at its under surface two pairs of pulleys 84 arranged in longitudinally spaced relation and carried on axes generally at right angles to the shafts 73 and 78. The pulleys 74, 79 and 84 have trained thereabout an endless belt 85. The belt 85 carries at predetermined, spaced points thereon a plurality of tabs or markers 86 forming indicia representing or simulating locations of row-crop plants. These tabs may be composed of any suitable material and are preferably flexible to enable them to pass easily about the pulleys. As best shown in Figures 5 and 9, the tabs are arranged a distance apart equal to the distance between plants that have been planted by checking mechanism. For the purposes of the present description, it can be assumed that the tabs of each pair are 42 inches apart.

In the operation of the demonstrating means, the tractor is first supported on the supporting means 50 and 58 as described above. The board 70 is arranged as described and the endless belt 85 driven from the tractor power shaft. The belt and the tabs carried thereby thus move longitudinally with respect to the tractor and cultivator shovels and the running speed thereof, with respect to the tractor, is such as corresponds to a usual cultivating speed. An operator seated on the operator's station 24 is enabled to view the board 70 in the same manner in which he would see plants were the implement engaged in actual cultivation. Assuming that the row-crop plants have been properly planted, there is no need to steer the tractor for guiding the shovels 36. Since misalined plants are numerous, it is purposed to demonstrate the implement under conditions almost exactly simulating conditions under which it would be actually operated. The upper runs of the endless belt 85 are placed transversely apart a distance sufficiently great to simulate fairly extreme conditions of plant misalinement. As the device is operated, pairs of tabs 86 appear along the upper surface of the board 70 and move toward the rear of the tractor, thus representing the locations of a pair of misalined plants. The operator, from his position on the station 24, has full view of the operation of the device and can steer the tractor and shift the cultivator shovels according to the positions of the tabs 86, representative of misalined plants. When the tabs 86, shown at present on the right hand upper run of the belt 85, have disappeared around the pulley 79 and below the board 70, other tabs will appear on the other upper run of the belt, and the tractor may be steered and the shovels shifted laterally to the other side. The operator is thus enabled to steer the tractor under circumstances closely approximating circumstances that would be actually encountered in the field, and the function and operation of the particular implement will be appropriately demonstrated to him.

The supports 50 and 58 are readily removable from beneath the tractor and, along with the board 70, provide portable means which may be easily and readily transported from one place to another. The members are, of course, suitably adapted for permanent location in a more or less permanent display.

From the foregoing description it will be seen that desirable means have been provided for demonstrating the operation and function of an agricultural implement of the tractor-mounted cultivator type, the important principle being that means are provided for generally simulating actual operating conditions, so that the operator may appreciate the peculiar features of the tractor-mounted implement without the necessity of engaging in expensive actual tests.

It will be understood, of course, that only a preferred embodiment of the invention has been illustrated and described and that numerous modifications and alterations may be made therein without departing from the spirit and scope of the invention as defined in the appended claims.

What is claimed is:

1. A support for a tractor having a main body including a drive-gearing housing formed with a lubricant drain opening, said support having means engageable with said housing at the opening therein.

2. A support for a tractor having a main body including a drive-gearing housing formed with an internally threaded lubricant drain opening, said support including a member threaded into said opening, a ground engaging member, and pivot means between the two members.

3. A support for the front end of a tractor having a main body carried at its front end on a steerable wheeled-truck, said truck including a vertical standard turnable with the truck about a vertical axis, said support including a member rigidly carried by the truck standard and pivotally supported from the ground for movement about a vertical axis rearwardly of the standard axis.

4. Supporting means for the front and rear ends of a tractor having a main body carried at its rear on a pair of ground wheels and at its front on a steerable wheeled-truck including a vertical standard turnable with the truck, said means comprising a rear support having a pivot member engageable with a rear, central portion of the tractor body and supporting the rear of the tractor with the rear wheels clear of the ground, and a front support comprising a member secured at one end to the truck standard and extending rearwardly thereof, and a jack pivotally associated between said member and the ground, the member and the jack supporting the front end of the tractor with the truck wheels clear of the floor.

5. Supporting means for a tractor having a main body carried at its rear on a pair of ground wheels and at its front on a steerable wheeled-truck including a vertical standard turnable with the truck, the main body including a rear axle housing formed at its under side with a centrally disposed lubricant drain opening, said supporting means comprising a rear support engageable between the ground and the tractor rear axle housing for supporting the rear end of the tractor with the rear wheels slightly clear of the ground, said support including at its upper end pivot means engageable with the aforesaid drain opening, and a front support engageable between the truck standard and the ground for supporting the front end of the tractor with the truck wheels slightly clear of the ground, said support being engageable with the ground at a point spaced rearwardly from the standard and including thereat pivot means for pivoting about a vertical axis.

6. Supporting means for a tractor having a main body carried at its rear on a pair of ground wheels and at its front on a steerable wheeled-truck including a vertical standard turnable with the truck, said supporting means comprising a rear support engageable between the ground and a rear, central portion of the tractor for supporting the rear end of the tractor with the rear wheels slightly clear of the ground, said support including at its upper end pivot means engageable with the tractor body, and a front support engageable between the truck standard and the ground for supporting the front end of the tractor with the truck wheels slightly clear of the ground, said support being engageable with the ground at a point spaced rearwardly from the standard and including thereat pivot means for pivoting about a vertical axis.

7. A support for the front end of a tractor having a front wheel structure including an axle, and a member rigidly carried at the front end of the tractor, said support comprising a ground-engaging member arranged rearwardly of the axle and including a forwardly extending portion engaging the axle, and a hanger member secured between the axle and the aforesaid front-end member.

8. Means for demonstrating the operation of a tractor-mounted cultivator, wherein the tractor includes a longitudinal body carried on rear wheels and front steerable wheels, and steering apparatus for the front wheels, the cultivator including a shovel arranged at one side of the tractor body and mounted for lateral swinging by connection with the steering apparatus, the demonstrating means including a rear support for supporting the rear end of the tractor pivotally at a point centrally of the tractor substantially at the axis of the rear wheels, a front support for supporting the front of the tractor for lateral swinging movement about the pivot provided by the rear support, said front support being associated with the tractor steering apparatus for swinging the tractor laterally, and means arranged at the side of the tractor body generally in alinement with the cultivator shovel and movable longitudinally with respect to the tractor and shovel, said means including indicia movable therewith and representing locations of row-crop plants.

9. Means for demonstrating the operation of a tractor-mounted cultivator, wherein the tractor includes a longitudinal body carried on rear wheels and front steerable wheels, and steering apparatus for the front wheels, the cultivator including a shovel arranged at one side of the tractor body and mounted for lateral swinging by connection with the steering apparatus, the demonstrating means including a support supporting the tractor with its wheels substantially free of the ground, including a pivoted member disposed on said support and connected to the tractor steering apparatus to adapt the tractor to be moved laterally to either side at the will of the operator, and means arranged at the side of the tractor body generally in alinement with the cultivator shovel and movable longitudinally with respect to the tractor and shovel, said means including indicia movable therewith and representing locations of row-crop plants.

10. Means for demonstrating the operation of a tractor-mounted cultivator, wherein the tractor includes a longitudinal body carried on rear wheels and front steerable wheels, and steering apparatus for the front wheels, the cultivator including a shovel arranged at one side of the tractor body and mounted for lateral swinging by connection with the steering apparatus, the demonstrating means including supporting means mounting the tractor free of the ground for lateral movement, means connected between the tractor steering apparatus and the ground for controlling the lateral movement by means of said steering apparatus, and means arranged at the side of the tractor body generally in alinement with the cultivator shovel and movable longitudinally with respect to the tractor and shovel, said means including indicia movable therewith and representing locations of row-crop plants.

BERT R. BENJAMIN.